United States Patent [19]

Bergman

[11] 4,132,961

[45] Jan. 2, 1979

[54] GASEOUS DISCHARGE STABILIZATION APPARATUS AND METHOD

[75] Inventor: Richard C. Bergman, Corfu, N.Y.

[73] Assignee: Calspan Corporation, Buffalo, N.Y.

[21] Appl. No.: 783,111

[22] Filed: Mar. 31, 1977

[51] Int. Cl.² ............................................ H01S 3/097
[52] U.S. Cl. ............................ 331/94.5 PE; 313/217; 313/231.4; 331/94.5 D
[58] Field of Search ................ 331/94.5 G, 94.5 D, 331/94.5 PE; 313/217, 231.3, 231.4, 362

[56] References Cited

U.S. PATENT DOCUMENTS

| 3,811,095 | 5/1974 | Rich et al. | 331/94.5 |
| 3,946,332 | 3/1976 | Samis | 331/94.5 G |
| 4,031,485 | 6/1977 | Crane et al. | 331/94.5 G |

OTHER PUBLICATIONS

Ben-Yosef et al., *Journal of Physics, Part E; Scientific Instruments*, vol. 4, Sep. 1971, pp. 708–709.

*Primary Examiner*—William L. Sikes
*Assistant Examiner*—Marcus S. Rasco
*Attorney, Agent, or Firm*—Allen J. Jaffe; David J. Zobkiw

[57] ABSTRACT

The electrical and mass efficiencies of an electrically excited flowing gas laser are improved by lining the discharge tube with a filler which minimizes the regions of slow or recirculating gas flow, and by utilizing a wire anode gas injector to feed laser gases into the discharge.

9 Claims, 7 Drawing Figures

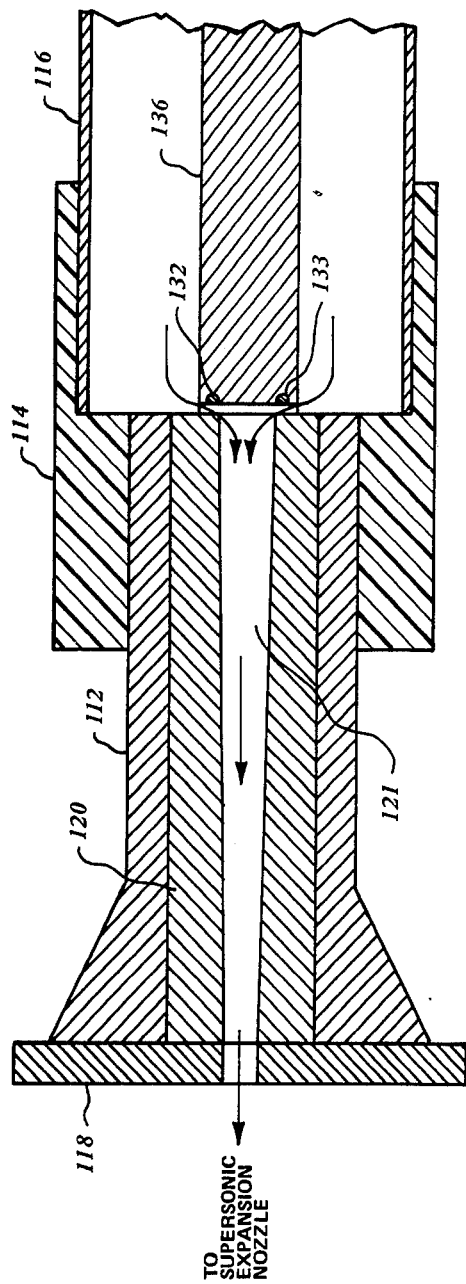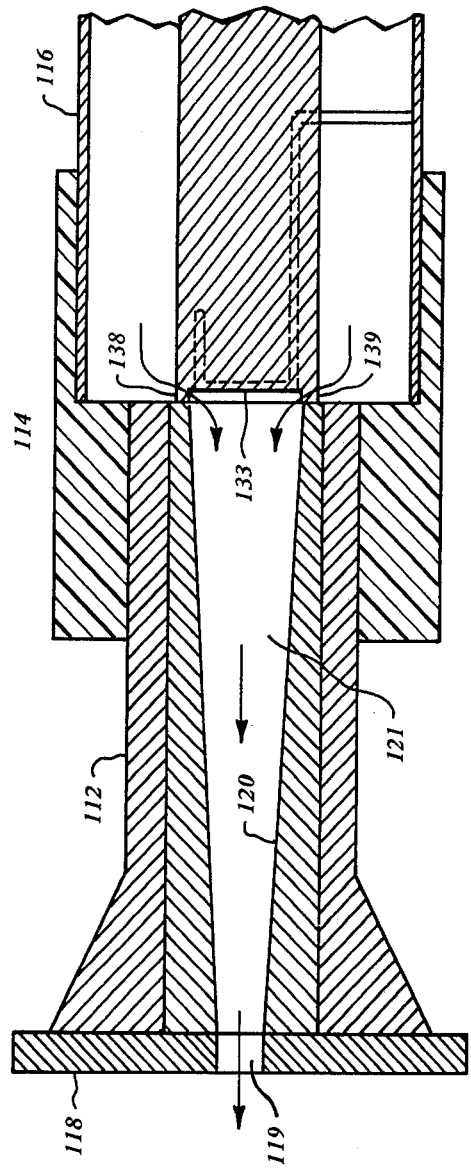

CO GDL PERFORMANCE COMPARISON, 2 IN. DISCHARGE SECTIONS

| CASE NO. | ACRYLIC TAPER | GAS INLET CONDITION | $P_{DISCHARGE}$ | $V_{DISCHARGE}$ | $I_{DISCHARGE}$ | CAVITY MACH NO. | $P_{CAVITY}$ | LASER POWER | EXPANSION HALF ANGLE | ELECTRICAL EFFICIENCY | MASS EFFICIENCY (watts/gm/sec) |
|---|---|---|---|---|---|---|---|---|---|---|---|
| 1 | NONE | ROOM TEMPERATURE | 0.72 atm | 9.8 KV | 40 ma | 3.2 | – torr | 0.5 watts | 15° | 0.1% | 0.36 |
| 2 | IN | ROOM TEMPERATURE | 0.81 | 14.8 | 45 | 3.2 | 15.2 | 13.0 | 15 | 2.0 | 7.43 |
| 3 | NONE | PRE-COOLED | 0.65 | 10.5 | 31 | 3.2 | – | 0.9 | 15 | 0.3 | 0.64 |
| 4 | IN | PRE-COOLED | 0.72 | 16.0 | 30 | 3.2 | 12.5 | 24.5 | 15 | 5.1 | 14.0 |

Fig. 6

CO GDL PERFORMANCE DATA, WIRE ANODE - CHANNEL DISCHARGE
5% OUTPUT COUPLING, M = 3.2 CAVITY

| CASE NO. | GAS INLET CONDITION | DISCHARGE PRESSURE atm | MASS FLOW gm sec$^{-1}$ | He MASS FLOW gm sec$^{-1}$ | CONCENTRATION OF CO % BY VOL. | OUTPUT POWER watts | ELECTRICAL EFFICIENCY % | MASS EFFICIENCY watts gm$^{-1}$ sec$^{-1}$ |
|---|---|---|---|---|---|---|---|---|
| 1 | PRECOOLED | 0.7 | 1.76 | 1.0 | 10.0 | 26.0 | 5.0 | 14.8 |
| 2 | ROOM TEMP. | 1.0 | 2.35 | 1.0 | 16.4 | 29.0 | 3.0 | 12.3 |
| 3 | PRECOOLED | 0.97 | 2.23 | 1.6 | 6.0 | 31.5 | 4.9 | 14.1 |
| 4 | ROOM TEMP. | 1.5 | 3.16 | 1.6 | 12.6 | 44.0 | 3.3 | 13.9 |
| 5 | ROOM TEMP. | 2.1 | 4.27 | 2.9 | 6.2 | 42.0 | 3.3 | 9.8 |

Fig. 7

GASEOUS DISCHARGE STABILIZATION APPARATUS AND METHOD

The invention herein described was made in the course of or under a contract with the U.S. Air Force.

Some types of electrically excited flowing gas lasers utilize a tubular discharge section with the gases introduced transverse to the discharge axis through a choked annulus, as first proposed by McLeary and Gibbs (see reference). In this type of laser, the choked annulus usually serves as the discharge anode. Using this discharge configuration as the high pressure plenum in the CO supersonic laser, which is the subject matter of U.S. Pat. No. 3,811,095, led to a mismatch of the discharge's circular cross sectional area and the expansion throat's rectangular cross sectional area. The larger the disparity in these cross sectional areas, the poorer the laser performance.

It is an object of this invention to minimize the region of slow gas flow in the discharge tube of a flowing gas laser.

It is an additional object of this invention to contain the discharge anode of a flowing gas laser wholly within a region of sonic gas flow.

It is a further object of this invention to provide a method and apparatus for stabilizing the gaseous discharge in a CO GDL.

It is a further object of this invention to increase the mass and electrical efficiencies of a flowing gas laser. These objects, and others as will become apparent hereinafter, are accomplished by the present invention.

According to the present invention, a suitable filler, such as acrylic or Pyrex, is attached to the inside of the glass discharge tube to form a rectangular cross sectional area discharge section slightly larger than the expansion throat cross sectional area. The filler provides a smooth transition from the anode injector channel to the expansion throat which also serves as the discharge cathode. The anode injector is formed by imbedding two copper wires in a Pyrex or Plexiglas rod with the wires being located flush with the inner end of the rod.

Basically, the present invention includes an anode injector which causes the high pressure gases to be injected at sonic velocity over the anodes and transversely into the discharge section. The discharge section is of an elongated rectangular cross section having at least a portion of which is tapered to provide a smooth transition from the anode injector to the expansion throat while causing increased turbulence in the discharge section and maintaining high velocity flow.

BRIEF DESCRIPTION OF THE DRAWINGS

For a fuller understanding of the present invention, reference should now be had to the following detailed description thereof taken in conjunction with the accompanying drawings wherein:

FIG. 4 is a side sectional view of a modified embodiment of the apparatus;

FIG. 5 is a top sectional view of the modified embodiment of FIG. 4;

FIG. 6 is a table showing the performance data for a CO GDL with and without the discharge filler; and FIG. 7 is a table showing the performance data for a CO GDL incorporating both the discharge filler and the wire anode injector.

DESCRIPTION OF THE PREFERRED EMBODIMENTS

Figure 1:
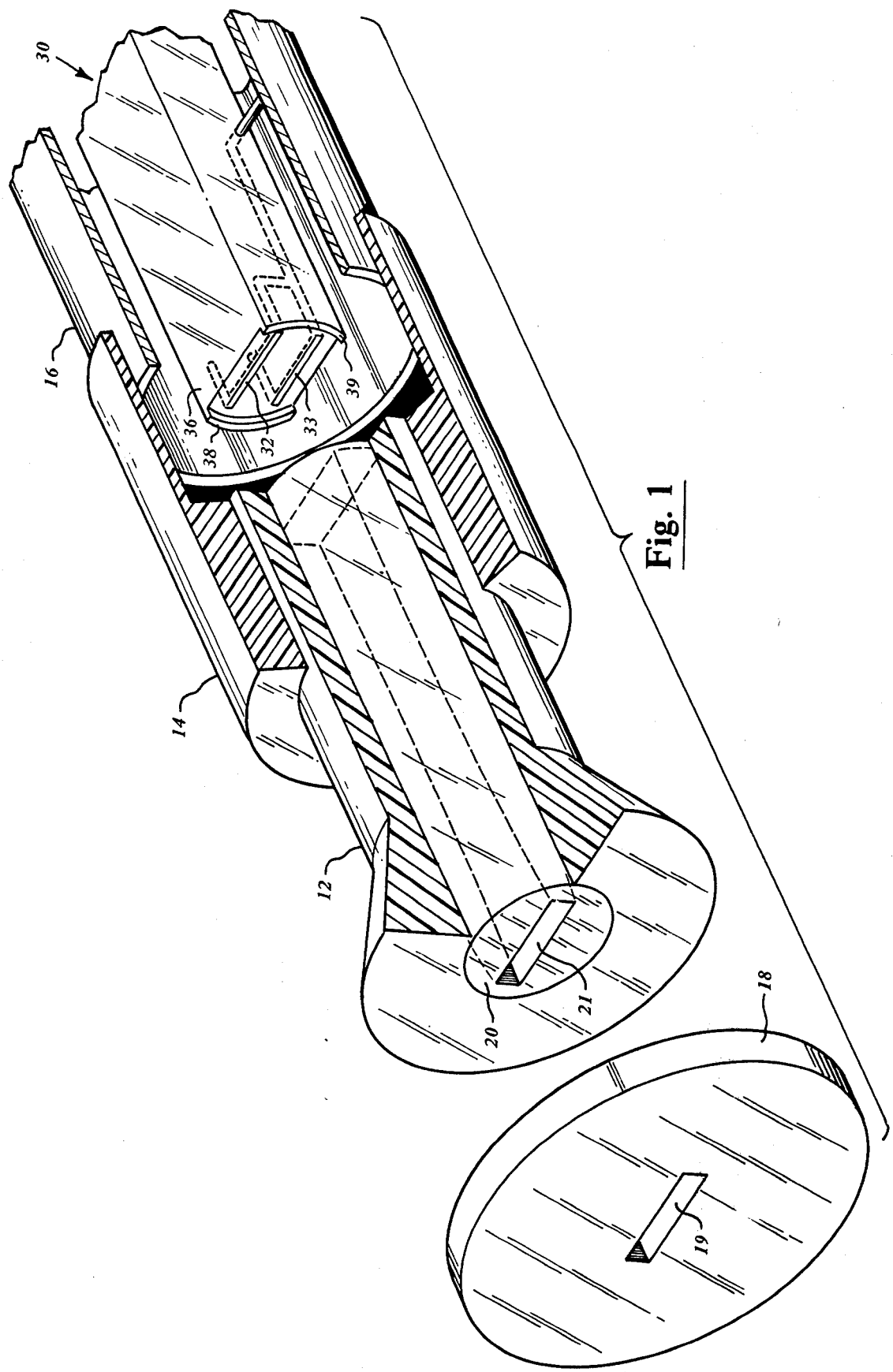
FIG. 1 is an exploded, partially sectioned isometric view of the apparatus of the present invention.
Figure 2:
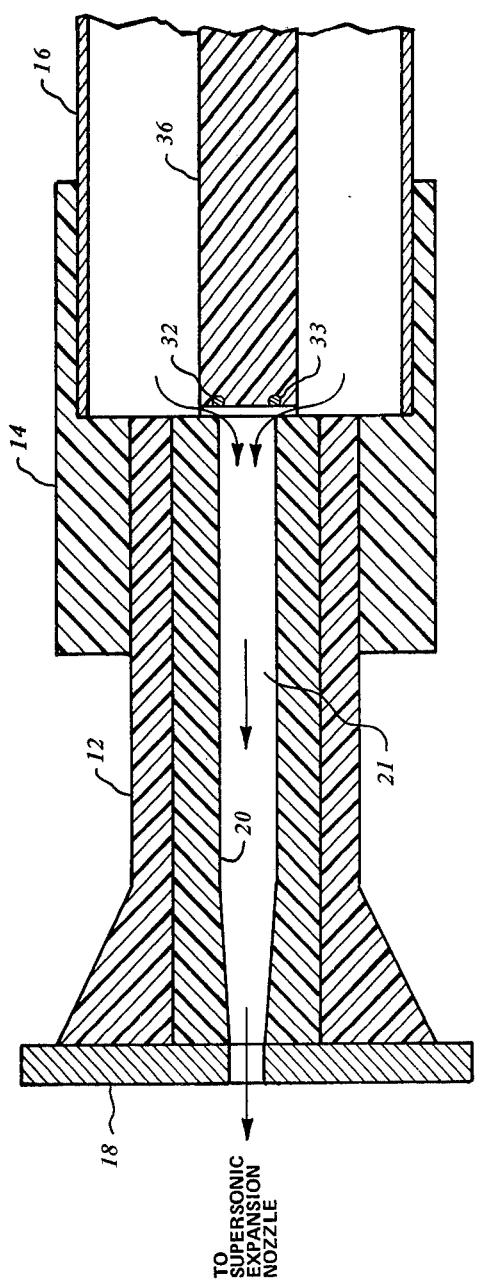
FIG. 2 is a side sectional view of the apparatus.
Figure 3:
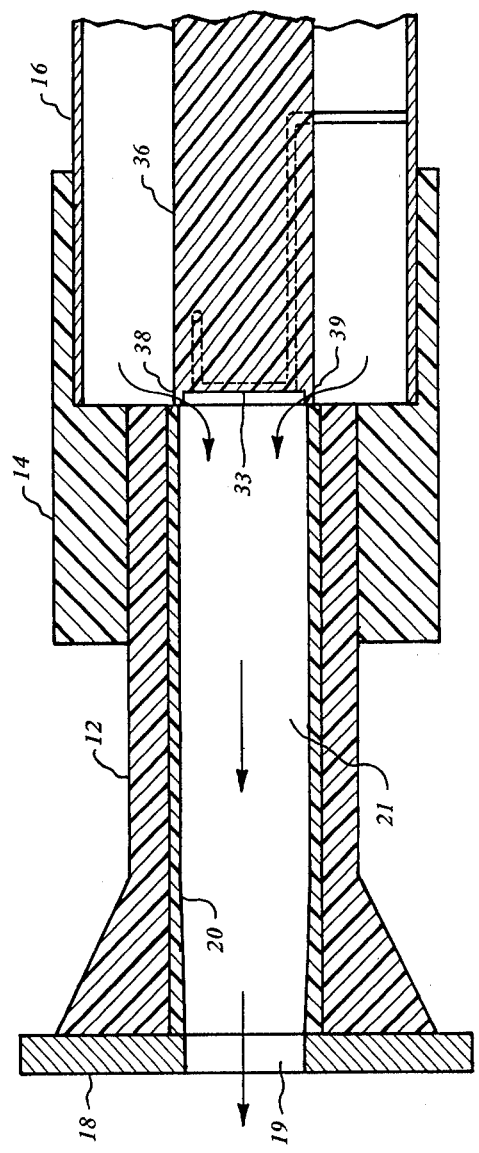
FIG. 3 is a top sectional view of the apparatus.

Referring to FIGS. 1 - 3, glass discharge tube 12 is coupled at one end to anode injector channel 16 by nylon coupler 14. Copper expansion throat member 18, which serves as the discharge cathode, is located at the other end of discharge tube 12 and has expansion throat 19 located therein. An acrylic discharge filler is attached to the inside of glass discharge tube 12 and defines the discharge section 20. An elongated rectangular passageway 21 is formed in discharge section 20 and provides a smooth transition from anode injector channel 16 to expansion throat 19. The cross section of passageway 21 tapers down to a cross sectional area slightly larger than expansion throat 19.

As best shown in FIG. 1, the rectangular anode injector 30 is formed by imbedding two copper wires, 32 and 33, in Plexiglas rod 36 with wires 32 and 33 being flush with the end of rod 36 and constituting wire anodes. The end of rod 36 is provided with two 0.025 inch lips, 38 and 39, which produce gaps defining radially extending restrictions at the top and bottom when rod 36 is positioned against the discharge section 20 as is best shown in FIG. 2. This configuration places the wire anodes 32 and 33 entirely within a region of sonic gas flow.

The embodiment of FIGS. 4 and 5 is similar to that of FIGS. 1 - 3 and corresponding structure has been labeled 100 higher. The basic differences in the embodiment of FIGS. 4 and 5 are the providing of a glass discharge section 120 and rod 136. Where a glass discharge section 120 is employed, a taper for the entire length of passageway 121 is preferred. The expansion throat 119 is illustrated as approaching a square in cross section, however, the exact dimensions of the expansion throat 119 will depend upon the corresponding inlet opening in the supersonic expansion nozzle.

OPERATION

In operation, wire anodes 32 and 33 and cathode 18 would be connected to a source of D.C. current. A high pressure mixture of carbon monoxide and helium diluent would be supplied to anode injector channel 16. The gases would then be injected through the 0.025 inch gaps formed by discharge section 20 and lips 38 and 39, over anodes 32 and 33 and transversely into tapering rectangular passageway 21. Although the rectangular passageway 21 in discharge section 20 and rectangular anode injector 30 coact to improve laser performance in the CO Gas Dynamic Laser without changing discharge parameters, more significant is the increased range of these important discharge parameters. The discharge current, discharge pressure and the concentration of CO in He can be significantly increased. These increases appear to be due to the increased gas turbulence which persists strongly throughout the channel flow and not just near the anode. The increased turbulence also causes an increase in the discharge E/N, the ratio of the electric field to the gas number density, which improves the vibrational excitation of the lasing species.

The Table of FIG. 6 shows a performance comparison for a 2 inch discharge tube with and without an acrylic filler. Although the comparison is not for exactly comparable conditions, the performance improvement is evident nevertheless. For the best performance, Case No. 4 in the Table of FIG. 6, the total mass flow was 1.75 gm/sec yielding a mass flow efficiency of 14.0 watts/gm/sec which represents more than a twentyfold improvement over the laser performance without the acrylic filler.

The Table of FIG. 7 presents the performance data for a CO GDL having both wire anode injector and channel discharge with an acrylic filler. Case No. 1 in FIG. 7 and Case No. 4 in FIG. 6 are for similar discharge conditions. It is seen that laser output power, electrical efficiency and mass efficiency are roughly the same in both cases. However, with room temperature inlet gases as in Case No. 2 of FIG. 7 the laser output power is more than double that in Case No. 2 of FIG. 6 which is for similar discharge conditions. This power increase is possible due to the increased concentration of CO being processed in the discharge of Case No. 2 of FIG. 5. Cases 3 – 5 of FIG. 5 present performance levels that were unobtainable without the wire anode injector. Discharge pressures to 2 atmospheres are easily obtained with high laser output power. These performance levels are possible because of the greater discharge stability introduced by the wire anode injector and thereby allowing a greater range of discharge parameters.

Although preferred embodiments of the present invention have been illustrated and described, other changes will occur to those skilled in the art. For example, the present invention can be used in subsonic devices, other materials may be used as the discharge filler and the amount and location of the tapered portion of the passageway may be changed. The wire anodes may be separate wires or sections of the same wire. The number of wires and restrictions may be varied but the number of each should be the same. It is therefore intended that the scope of the present invention is to be limited only by the scope of the appended claims.

REFERENCE

R. McLeary and W. E. K. Gibbs, "CW $CO_2$ Laser at Atmospheric Pressure", IEEE J. Quantum Electron., QE-9, pp 828–833, Aug. 1973.

I claim:

1. In an electrically excited flowing gas laser, gaseous discharge stabilization apparatus including:
   a discharge tube having a first end and a second end;
   a passageway in said discharge tube having a rectangular cross sectional area;
   a high pressure mixture of laser gases upstream of said passageway;
   anode injector means, including at least one anode means, located exteriorly of said passageway and coacting with said first end of said discharge tube to define a plurality of radially extending restrictions communicating with said passageway for causing the high pressure gases to be injected at sonic velocity over said at least one anode means and transversely into said discharge tube;
   cathode means coacting with said second end of said discharge tube to define an expansion throat;
   a source of DC current operatively connected to said at least one anode means and said cathode means; thereby resulting in increased turbulence which permits an increased discharge current, discharge pressure and concentration of laser gases.

2. The apparatus of claim 1 wherein said anode injector means includes a pair of wires defining said at least one anode means and imbedded in an end of a rod with a pair of axially extending lips on said end of the rod coacting with said first end of said discharge tube to define said plurality of radially extending restrictions communicating with said passageway, and extending essentially perpendicular to said pair of wires.

3. The apparatus of claim 1 wherein said passageway is an acrylic discharge filler lining said discharge tube.

4. The apparatus of claim 3 wherein said anode injector means includes a pair of wires defining said at least one anode means and imbedded in an end of a rod with a pair of axially extending lips on said end of the rod coacting with said first end of said discharge tube to define said plurality of radially extending restrictions communicating with said passageway, and extending essentially perpendicular to said pair of wires.

5. The apparatus of claim 1 wherein said passageway is a glass discharge filler lining said discharge tube.

6. The apparatus of claim 5 wherein said anode injector means includes a pair of wires defining said at least one anode means and imbedded in an end of a rod with a pair of axially extending lips on said end of the rod coacting with said first end of said discharge tube to define said plurality of radially extending restrictions communicating with said passageway, and extending essentially perpendicular to said pair of wires.

7. The apparatus of claim 1 wherein said passageway in said discharge tube is tapered.

8. The apparatus of claim 1 wherein said anode injector means includes a rod with a pair of axially extending lips on an end of the rod and coacting with said first end of said discharge tube to define the plurality of radially extending restrictions between said lips; and, said anode means includes a pair of wires imbedded in said end of the rod and extending essentially between said lips across the portions of said end of the rod corresponding to said radially extending restrictions whereby said laser gases pass through said radially extending restrictions and over said wires.

9. A method for stabilizing the gaseous discharge in an electrically excited flowing gas laser including the steps of:
   supplying high pressure laser gases;
   injecting the laser gases at sonic velocity radially over wire anodes;
   passing the injected laser gases transversely through a tapering discharge section to an expansion throat defining a cathode and thereby causing turbulence and high velocity flow in the injected laser gases within a discharge section whereby an increased discharge current, discharge pressure and concentration of laser gases are achieved.

* * * * *